US008587640B2

(12) United States Patent
Gavrilenco (10) Patent No.: US 8,587,640 B2
(45) Date of Patent: Nov. 19, 2013

(54) DISPLAY DEVICE FOR DISPLAYING CROSS-SECTIONAL REPRESENTATIONS OF AN OBJECT (75) Inventor: Colin Gavrilenco, Montreal (CA)

(73) Assignee: Colin Gavrilenco, Montreal, Quebec (CA)

( * ) Notice: Subject to any disclaimer, the term of this patent is extended or adjusted under 35 U.S.C. 154(b) by 353 days.

(21) Appl. No.: 12/994,804

(22) PCT Filed: May 25, 2009

(86) PCT No.: PCT/CA2009/000709
§ 371 (c)(1),
(2), (4) Date: Nov. 26, 2010

(87) PCT Pub. No.: WO2009/143607
PCT Pub. Date: Dec. 3, 2009

(65) Prior Publication Data
US 2011/0074936 A1    Mar. 31, 2011

Related U.S. Application Data (60) Provisional application No. 61/056,028, filed on May 26, 2008.

(51) Int. Cl.
*H04N 13/04* (2006.01)
(52) U.S. Cl.
USPC ............................................. 348/51; 348/42
(58) Field of Classification Search
USPC .................................................. 348/42–161
See application file for complete search history.

(56) References Cited

U.S. PATENT DOCUMENTS

| 4,188,126 | A | * | 2/1980 | Boisde et al. ................. 356/440 |
| 4,712,869 | A |   | 12/1987 | Claxton |
| 5,023,895 | A | * | 6/1991 | McCroskey et al. .............. 378/4 |
| 5,978,440 | A | * | 11/1999 | Kang et al. ...................... 378/21 |
| 6,275,718 | B1 | * | 8/2001 | Lempert ....................... 600/407 |
| 6,404,437 | B1 |   | 6/2002 | Russell et al. |
| 7,200,541 | B2 |   | 4/2007 | Kropaczek et al. |

(Continued)

FOREIGN PATENT DOCUMENTS

CA    2541157    4/2005

OTHER PUBLICATIONS

Fujitsuka et al., Experience and Evaluation of Advanced Online Core Monitoring System "Beacon" at IKATA Site, 1994.

(Continued)

*Primary Examiner* — Joseph Ustaris
*Assistant Examiner* — Talha Nawaz
(74) *Attorney, Agent, or Firm* — Norton Rose Fulbright Canada LLP/S.E.N.C.R.L., s.r.l.

(57) ABSTRACT

There is described a display device for displaying cross-sectional representations of an object, the display device comprising: a frame; and a plurality of display units mounted on the frame, each one of the plurality of display units adapted to display a cross-sectional image of the object, the cross-sectional image comprising at least one internal feature of the object and being dependent on a spatial position in a three-dimensional environment of a corresponding one of the plurality of display units on which the cross-sectional image is to be displayed, the plurality of display units being connectable to a processor adapted to generate the cross-sectional image for each one of the plurality of display units as function of the spatial position.

11 Claims, 10 Drawing Sheets

(56) References Cited

U.S. PATENT DOCUMENTS

| | | | |
|---|---|---|---|
| 7,444,011 B2 * | 10/2008 | Pan et al. | 382/131 |
| 7,952,718 B2 * | 5/2011 | Li et al. | 356/479 |
| 2002/0001030 A1 * | 1/2002 | Kuiseko et al. | 348/51 |
| 2003/0063258 A1 * | 4/2003 | Torii et al. | 351/214 |
| 2003/0080923 A1 | 5/2003 | Suyama et al. | |
| 2003/0118150 A1 * | 6/2003 | Hirabayashi et al. | 378/59 |
| 2004/0218152 A1 * | 11/2004 | Jung | 353/69 |
| 2007/0009222 A1 | 1/2007 | Koo et al. | |
| 2007/0070299 A1 * | 3/2007 | Lee et al. | 353/78 |
| 2007/0176852 A1 | 8/2007 | Yokosawa | |
| 2007/0203541 A1 | 8/2007 | Goetz et al. | |
| 2009/0105597 A1 | 4/2009 | Abraham | |
| 2009/0312980 A1 * | 12/2009 | Kobayashi et al. | 702/150 |
| 2012/0293805 A1 * | 11/2012 | Tsai et al. | 356/453 |

OTHER PUBLICATIONS

Berg et al., Application of the Core Surveillance System SCORPIO at Sizewell B, 1996.

Antariksawan et al., Validation of RELAP/SCDAP SIM/MOD 3.4 for Research Reactor Applications, May 16, 2005.

Sarode et al. , Visual Environment with High Resolution Tiled Display and PC Rendering Cluster, Sep. 2004.

Activity of the Applied Reactor Physics Department (http://www.kfki.hu/%7Eaekihp/arlhome/html/activity.html), Apr. 23, 1996.

International Search Report, PCT/CA2009/000709, 2009.

Won-Suk Chun et al., Spatial 3-D Infrastructure: Display-Independent Software Framework, High-Speed Rendering Electronics, and Several New Displays, Appeared in Stereoscopic Displays and Virtual Reality Systems XII, edited by Andrew J. Woods, Mark T. Bolas, John O. Merritt, Ian E. McDowall, Proceedings of SPIE-IS&T Electronic Imaging, SPIE vol. 5664, pp. 302-312 (2005).

Gregg E. Favalora et al., "100 Million-voxel volumetric display", Actuality Systems, Inc., Burlington, USA, Apr. 2, 2002.

Gregg E. Favalora, "Volumetric 3D Displays and Application Infrastructure", Actuality Systems, Inc., Published by the IEEE Computer Society, Aug. 2005, pp. 37-44.

* cited by examiner

DISPLAY DEVICE FOR DISPLAYING CROSS-SECTIONAL REPRESENTATIONS OF AN OBJECT

CROSS-REFERENCE TO RELATED APPLICATIONS

The present application claims priority under 35 USC§119 (e) of Provisional Patent Application bearing Ser. No. 61/056,028, filed on May 26, 2008, the contents of which are hereby incorporated by reference.

TECHNICAL FIELD

The present invention relates to the field of visualization devices, and particularly to the field of visualization devices for displaying cross-sectional representations of an object.

BACKGROUND OF THE INVENTION

One way to create a 3D image of an object is to display a perspective view of the object on a display device such as a monitor. The user can manipulate the object and display cross-sections of the object. However, a perspective view of an object is not a real 3D representation of the object.

Methods such as stereoscopy, autostereoscopy, and holography are used to create a real 3D image of an object. However these techniques do not allow a user to easily manipulate the displayed object or display across-section of the object. They can also be very complex to generate.

Therefore, there is a need for a method and apparatus for displaying cross-sectional representations of an object.

SUMMARY OF THE INVENTION

In accordance with a first broad aspect, there is provided a display device for displaying cross-sectional representations of an object, the display device comprising: a frame; and a plurality of display units mounted on the frame, each one of the plurality of display units adapted to display a cross-sectional image of the object, the cross-sectional image comprising at least one internal feature of the object and being dependent on a spatial position in a three-dimensional environment of a corresponding one of the plurality of display units on which the cross-sectional image is to be displayed, the plurality of display units being connectable to a processor adapted to generate the cross-sectional image for each one of the plurality of display units as function of the spatial position.

In accordance with a second broad aspect, there is provided a method for displaying cross-sectional representations of an object, the method comprising: receiving an image for each one of a plurality of display units, the image comprising at least one internal feature of the object and being a cross-sectional representation of the object according to a spatial position in a three-dimensional environment of a corresponding display unit on which the image is to be displayed; and displaying the image on the corresponding display unit for each one of the plurality of display units.

In accordance with a third broad aspect, there is provided a system for providing cross-sectional representations of an object, the system comprising: a processor in a computer system; a memory accessible by the processor; and an application coupled to the processor, the application configured for: generating an image for each one of a plurality of display units, the image comprising at least one internal feature of the object and being a cross-sectional representation of the object according to a spatial position in a three-dimensional environment of a corresponding display unit on which the image is to be displayed; and transmitting the image to the corresponding display unit for each one of the plurality of display units.

In accordance with a further broad aspect, there is provided a method for providing cross-sectional representations of an object, the method comprising: generating an image for each one of a plurality of display units, the image comprising at least one internal feature of the object and being a cross-sectional representation of the object according to a spatial position in a three-dimensional environment of a corresponding display unit on which the image is to be displayed; and transmitting the image to the corresponding display unit for each one of the plurality of display units.

The term "object" is used to represent any physical or abstract entity which can be represented in 3 dimensions. The object can be a physical entity such as a building having floors, stairs, or rooms. Another example of a physical object is a 3D area of interest of an ocean with vessels and submarines as physical internal features. The object can also be a physical entity having physical and abstract features such as a nuclear reactor. In this case, the fuel rods, the control rods, and water are examples of internal physical features of the object while the temperature and pressure distribution are examples of internal abstract features or properties. An object can also be only abstract, such as a 3D graph representing statistics or a 3D movie, for example.

The term "frame" refers to any structural system that supports and maintains in position at least one display unit. The display units can have a fixed position relative to the frame. Alternatively, they can have a variable position relative to the frame, which means that they can move with respect to the frame while staying supported by or attached to the frame.

The terms "see-through display unit" and "transparent display unit" refer to a display permitting the passage of rays of light. As a result, both an object displayed on the transparent display unit and an object located behind the display unit may be seen. Transparent liquid crystal display (LCD) and transparent electroluminescent displays are examples of transparent display units.

BRIEF DESCRIPTION OF THE DRAWINGS

Further features and advantages of the present invention will become apparent from the following detailed description, taken in combination with the appended drawings, in which.

DETAILED DESCRIPTION

Figure 1:
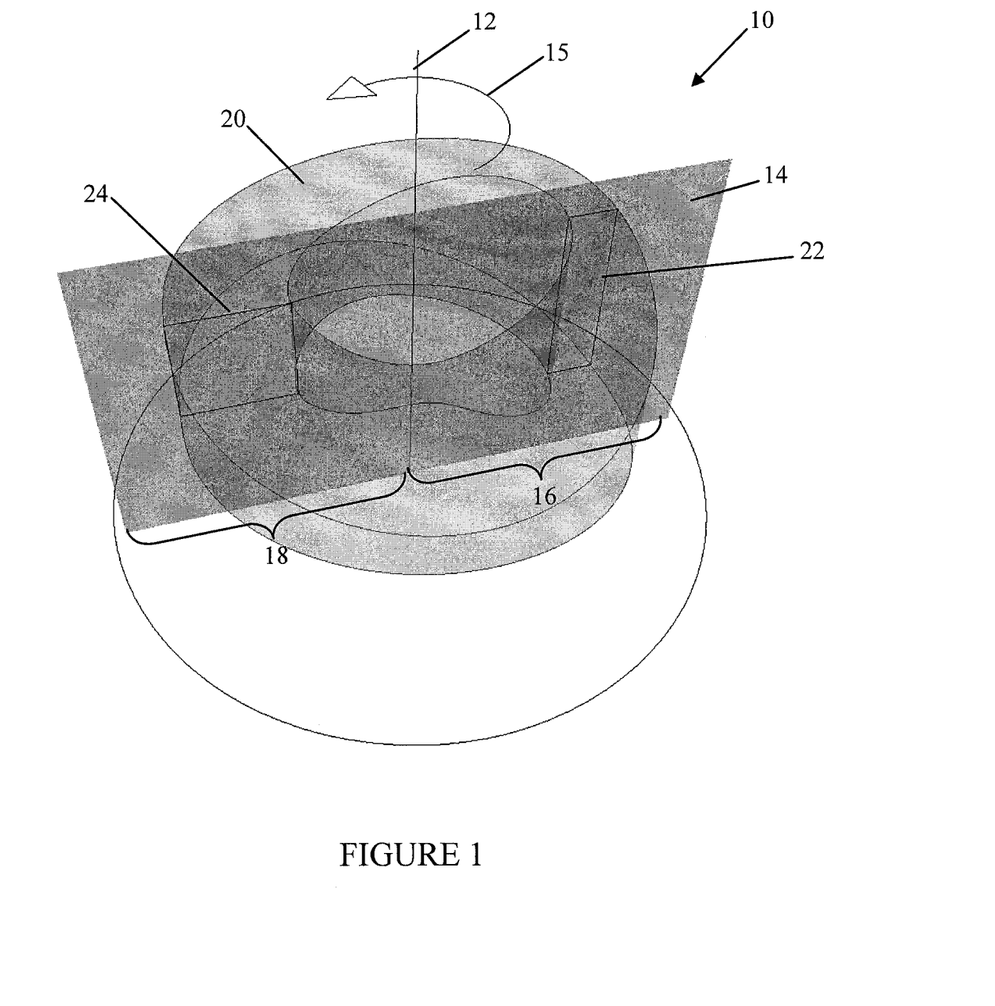
FIG. 1 is a perspective view of a display device comprising a single display unit in a first position and displaying two images, in accordance with an embodiment.

FIG. 1 illustrates one embodiment of a display device 10. The display device 10 comprises a frame 12 and a display unit 14. The frame 12 includes a vertically extending rod which divides the display unit 14 into two display areas 16 and 18 and around which the display unit 14 is allowed to rotate according to arrow 15. The display device 10 is used to display a representation of an object having a doughnut shape and of which a virtual representation is illustrated as 20 for illustrative purposes. Each one of the display areas 16, 18 displays a respective cross-sectional representation 22, 24 of the object according to its position relative to the frame 12.

While FIG. 1 illustrates that the display unit 14 is contra-clockwise rotatable, it should be understood that the display unit 14 may be clockwise rotatable or clockwise and contra-clockwise rotatable. While the rod of the frame 12 is vertically extending, it should be noted that other orientations for the rod are possible. For example, the rod of the frame 12 may be horizontal.

In one embodiment, the display device 10 is connected to a computer and the object displayed on the display device 10 is the doughnut-shaped object 20 simulated by the computer. The computer comprises a memory on which the simulated model of the object is stored, a processor and communication means. Each one of the position of the display areas 16 and 18 defines a geometrical plane having respective spatial coordinates. The spatial coordinates can be in the form of at least one vector or a value of an angle. The frame 12 is adapted to determine the coordinates of the planes defined by the display areas 16 and 18. Alternatively, the display unit 14 itself can be adapted to determine the position of the display areas 16 and 18 and to communicate with the computer. It should be noted that the position of the display unit 14 can be sufficient to know the position of both the display areas 16 and 18. The representations 22 and 24 displayed on the display areas 16 and 18 are the cross-sections of the object resulting from the intersection of the 3D model of the object with the respective geometrical plane defined by the spatial position of the display areas 16 and 18. The processor generates the cross-sectional images 22 and 24 of the object to be displayed according to the spatial coordinates of the display areas 16 and 18. The computer communicates the cross-sectional images 22 and 24 to the display device 10 through the communication means. The cross-sectional images 22 and 24 are displayed on their respective display areas, namely display areas 16 and 18. While an object represented in perspective view on a 2D display unit such as a screen has to be manipulated in order to display a cross-section for example, the display device 10 itself is manipulated in order to display the desired cross-section. By rotating the display unit 14 around the rod of the frame 12, other cross-sectional images are displayed on the display areas 16 and 18 according to the new spatial positions of the display areas 16 and 18.

It should be understood that any positioning system allowing the determination of the position of the display unit 14 or the display areas 16 and 18 can be used. For example, the position of the display unit can be determined by a positioning system external to the display device 10. Optical markers can be positioned on the display unit 14 and a camera connected to the computer determines the location of the display unit 14 according to the location of the optical markers by the computer. The positioning system then sends the spatial positions of the display areas 16 and 18 to the computer which generates the appropriate cross-sectional images according to the spatial positions of the display areas 16 and 18.

In one embodiment, the image displayed on the display unit corresponds to measured data. The measured data is measured by any adequate type of sensors and then transmitted to the computer through the communication means. The received measured data is stored in the memory of the computer. Using the measured data, the processor of the computer generates the appropriate images according to the position of the display areas. The computer then sends the images to the display device 10 and the images are displayed on their respective display areas 16 and 18.

In one embodiment, the cross-sectional images 22, 24 only represent the outline of the object according to the position of the display areas 16 and 18, respectively. Alternatively, they can also represent an internal property or feature such as a temperature distribution in addition to the outline.

It should be understood that the displayed images 22 and 24 may be independent of time. Alternatively, they may vary with time. For example, the images 22 and 24 may be a representation of a temperature distribution inside the object within the cross-sections defined by the display areas 16 and 18. The temperature distribution may vary as a function of time and a user can visualize the time variation of the temperature while looking at the display device 10.

In one embodiment, when the object is time-dependent, i.e. when a feature of the object varies with time, the displaying of the images is synchronized with the object in order to obtain a substantially real-time display of the object. Alternatively, the displaying of the images may be speedup or slowdown in comparison to the object.

Figure 2:
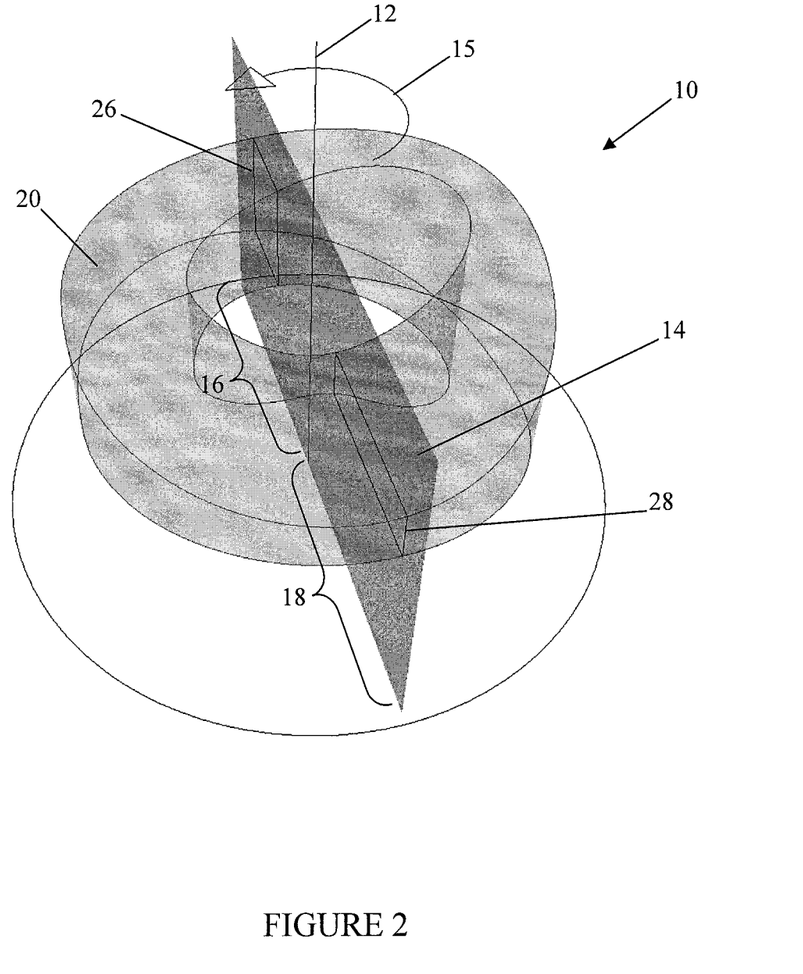
FIG. 2 is a perspective view of the display unit of FIG. 1 in which the display unit occupies a second position, in accordance with an embodiment.

FIG. 2 illustrates the display device 10 in which the display unit 14 occupies a second position relative to the frame 12. In comparison with FIG. 1, the display unit 14 is moved to a second position according to arrow 15. In this second position, images 26 and 28 are displayed on display areas 16 and 18, respectively. These images 26 and 28 are representations of the cross-sections of the 3D object according to the coordinates of the geometrical planes defined by the spatial position of the display areas 16 and 18.

In one embodiment, the display unit 14 is a non-transparent display which displays a cross-sectional representation of the object on one of its side. The display unit 14 can include two non-transparent display units placed one behind the other to display the same cross-sectional representation of the object on each side of the display unit 14. Alternatively, a different cross-sectional representation of the object can be displayed on each side. For example, information relative to temperature can be displayed on one side and information relative to pressure can be displayed on the other side of the display unit 14.

In another embodiment, the display unit 14 is a transparent display allowing a user to see the representation of the object on both sides of the display unit 14.

In one embodiment, the frame 12 is motorized and a displacement of the movable display unit 14 is controlled via the computer. A user can select the desired cross-section of the object to be displayed on the computer which discontinuously rotates the display unit 14 to the target position corresponding to the selected cross-section. In this case, the display unit 14 does not continuously rotates about the rod of the frame 12 to create a reciprocating motion, but rotates the display unit 14 in a stepwise manner between an initial position and a target/desired position. Once the display unit 14 has reached the target position corresponding to the selected cross-section, the computer stops rotating the display unit 14 until a next command to be entered by the user. Alternatively, the user selects on the computer a desired position for the display unit 14 and the computer moves the display unit 14 to the desired position using the motorized mechanism of the frame 12. Once the display 14 has reached the desired position, the computer displays the corresponding cross-sections of the objects on the display unit 14.

In another embodiment, the display unit 14 can be rotated manually by the user to the desired position and the computer selects the cross-sections corresponding to the desired position which are displayed on the display unit 14.

In one embodiment, cross-sections are continuously displayed on the display unit 14 during the displacement of the display unit 14. Alternatively, a cross-section of the object is only displayed once the display unit 14 has reached the desired position and no cross-sections of the object are displayed during the rotation of the display unit 14.

In the case that the display device 10 is motorized, the display unit can continuously rotate around the rod 12 at a predetermined speed corresponding to a predetermined time interval. The display unit 14 occupies a specific spatial position at each predetermined time interval. The cross-sectional image corresponding to the specific spatial position is then displayed at each predetermined time interval. In a particular embodiment in which the display unit 14 is a transparent or see-through display, the predetermined speed is chosen in accordance with the human persistence of vision so that the display device 10 forms a swept-volume display.

While the display unit 14 illustrated in FIGS. 1 and 2 is rotatably secured to the rod of the frame 12 to provide two display areas 16, 18, it should be understood that one end of the display unit 14 may be attached to the rod such that the display unit comprises a single display area.

Figure 3:
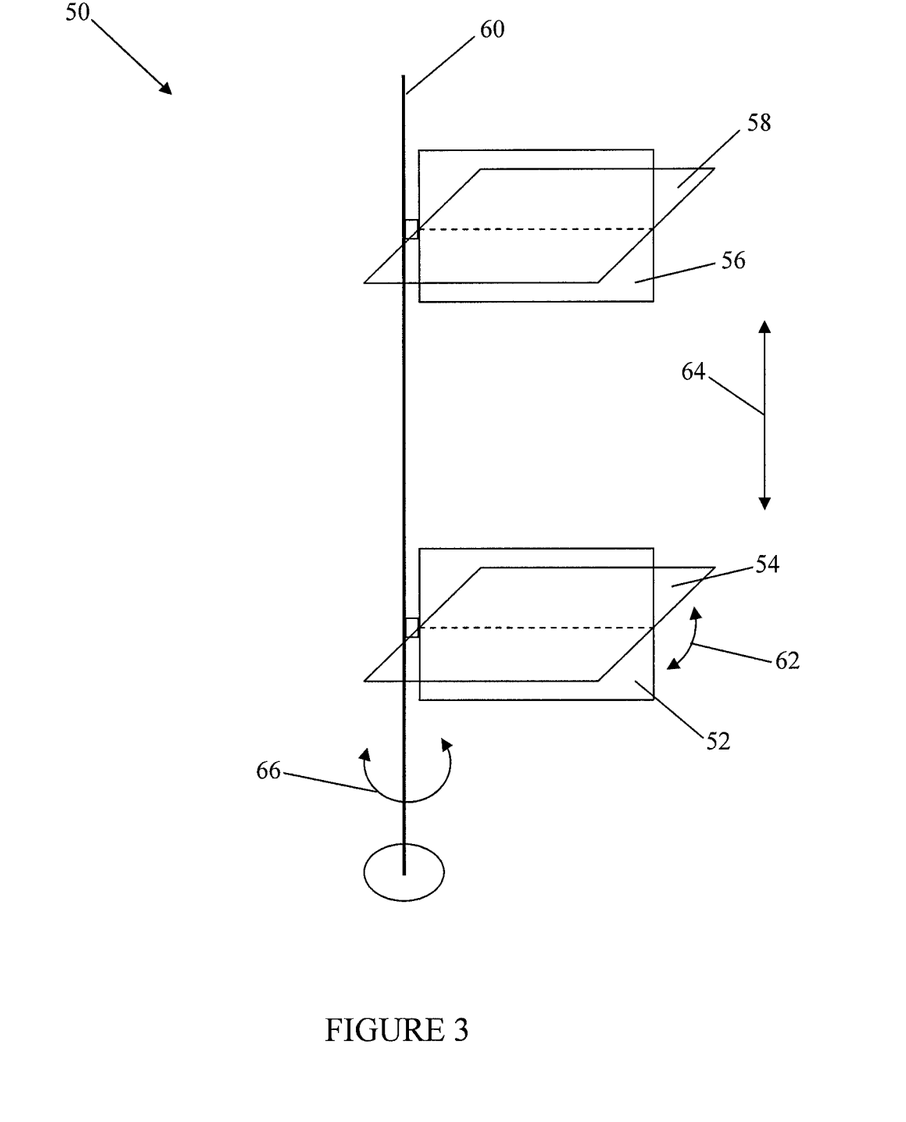
FIG. 3 illustrates four positions that a display unit can take within a display device, in accordance with an embodiment.

FIG. 3 illustrates one embodiment of a display device 50 comprising a single display unit to display a single cross-sectional representation of an object at a time. Display units 52, 54, 56, and 58 are representations of a same display unit for four different positions relative to a frame 60. The display unit is provided with a plurality of degrees of freedom with respect to the frame 60. The display unit can move from the first position 52 to the second position 54 according to arrow 62. The display unit can also be moved upwardly according to arrow 64 in order to reach the positions 56 and 58. Furthermore, the display unit can rotate around the frame 60 according to arrow 66. It should be understood that the display unit can be provided with any degree of freedom with respect to the frame 60 so that any cross-sectional view of the object can be displayed on the display unit.

Figure 4:
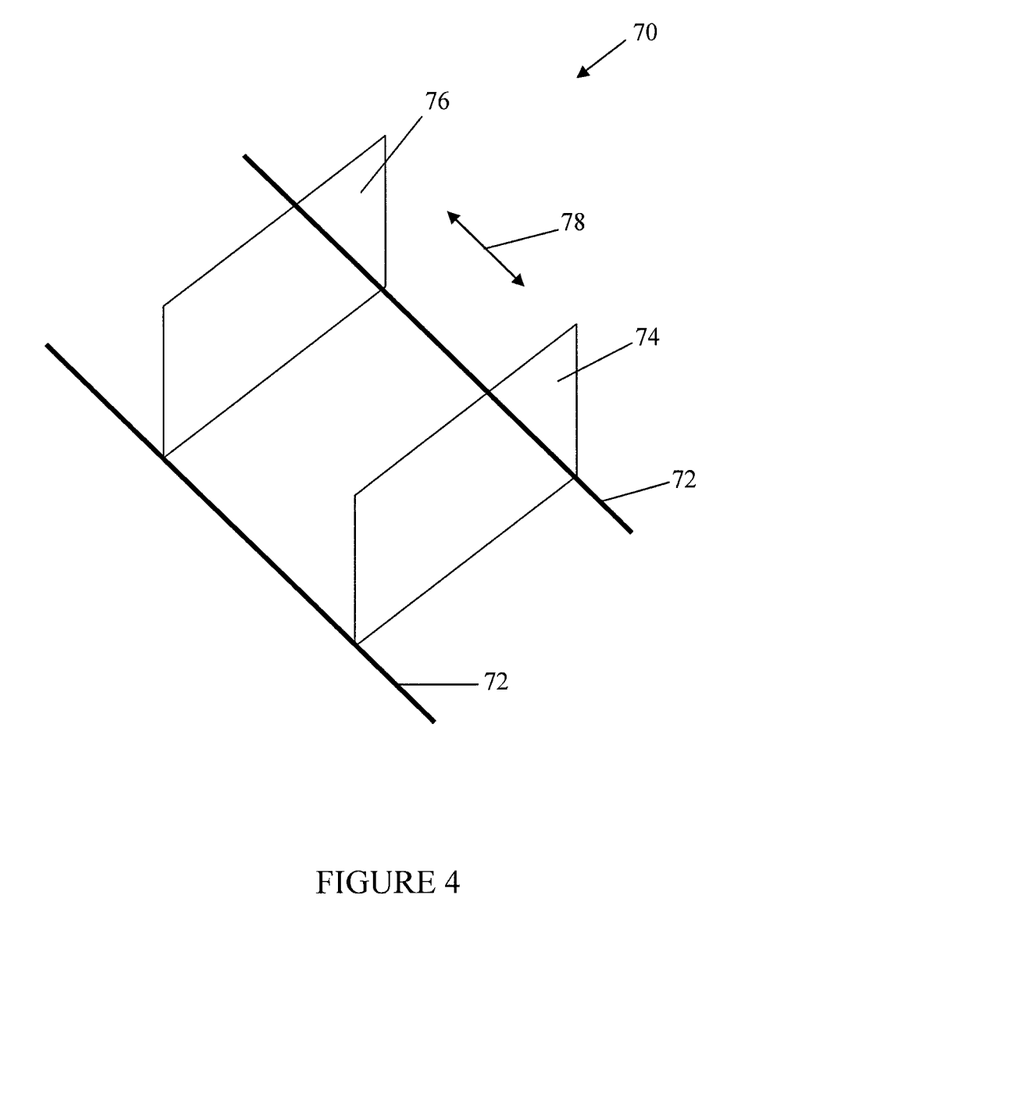
FIG. 4 is a perspective view of a display device comprising parallel rails for displacing a display unit, in accordance with an embodiment.

FIG. 4 illustrates one embodiment of a display device 70 comprising a single display unit and a pair of rails 72 as a frame. The single display can be translated along the rails 72 from a first position 74 to a second position 76 according to arrow 78. The display unit can take a plurality of positions along the rails 72. The displacement of the display unit can be motorized or manually performed.

Figure 5:
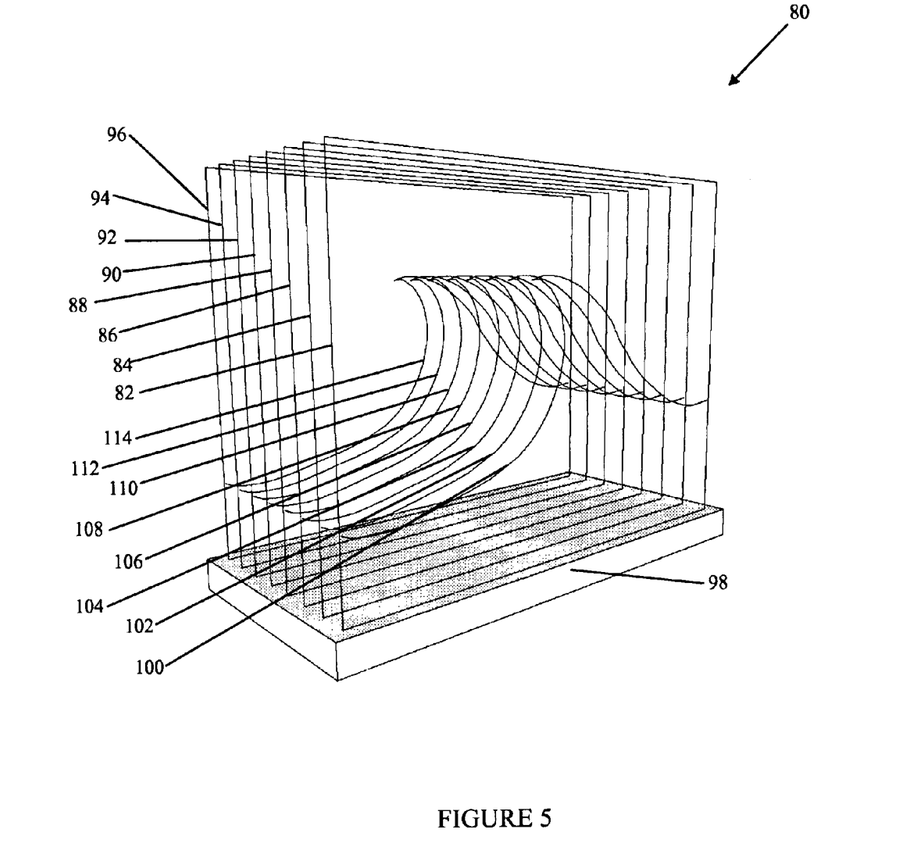
FIG. 5 is a perspective view of a display device comprising eight display units installed one behind the other, in accordance with an embodiment.

While the embodiments of the display device 10, 50 and 70 illustrated in FIGS. 1-4 comprise a single display unit, FIG. 5 illustrates one embodiment of a display device 80 comprising 8 display units 82-96. The display units 82-96 are transparent or see-through displays and they are mounted sequentially on a frame 98. The display units 82-96 may have a fixed or variable position with respect to the frame 98. Alternatively, some of the display units 82-96 may have a fixed position while others can move relative to the frame 98. The display device 80 is connected to a computer which generates a cross-sectional image 100-114 for each one of the display units 82-96, respectively, according to the position of each one of display units 82-96.

In FIG. 5, the object is an ocean surface wave which is either simulated by the computer or generated by the computer using measured data. The computer stores the generated or measured model of the ocean surface wave in a memory. The computer generates a cross-sectional image 100-114 for each one of the display units 82-96 according to its position and transmits the generated images 100-114 to the display device 80 to be displayed on the corresponding display unit 82-96, respectively. For example, the cross-sectional image 100 is generated according to the spatial position of the display unit 82 relative to the frame 98 and is displayed on the display unit 100.

The transparency of the display units 82-96 allows a 3D visualization of the ocean surface wave. As the display units 82-96 are transparent or partially transparent, a user looking at the display device 80 sees the image 100 displayed on the first display unit 82 and also what is behind the display unit 100, namely the images 102-114.

In one embodiment, the last display unit 96 is a non-transparent display unit displaying the cross-sectional image 114. Alternatively, the last display unit 96 may display a background image. In another embodiment, the last display unit may be replaced by a mirror to give a depth perspective to a user looking at the display device 80.

Figure 6:
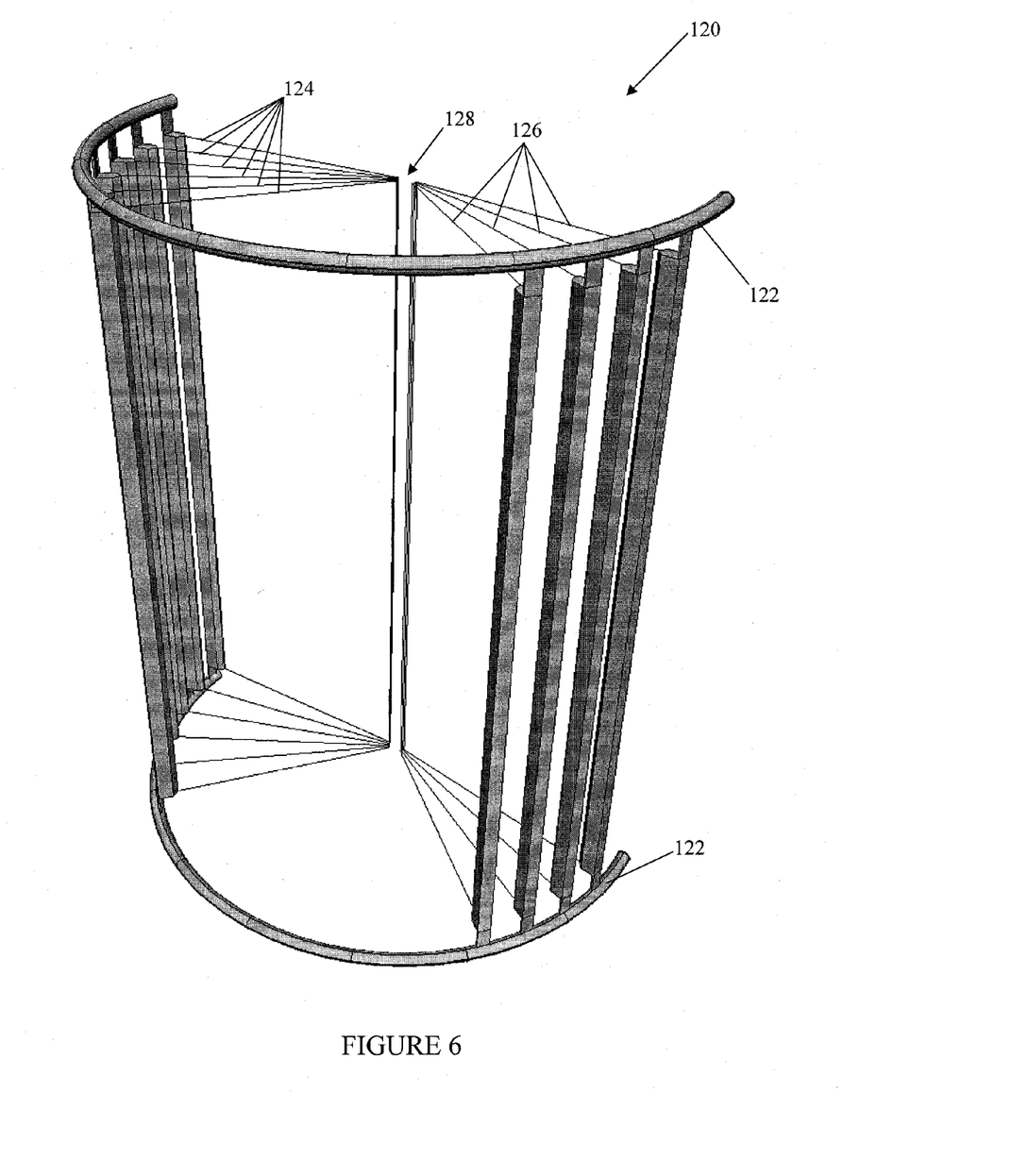
FIG. 6 is a perspective view of a semicircular display device, in accordance with an embodiment.

FIG. 6 illustrates one embodiment of a semicircular display device 120. The display device 120 comprises a frame constituted of two semicircular rails 122 and ten transparent display units 124 and 126. Alternatively, the display units 124 and 126 may be non-transparent. The display units are divided into two sets, i.e. a first set of 6 display units 124 and a second set of four display units 126. The display units 124 have one end connected to the rails 122 and the other end connected together. The same arrangement also exists for the second set of display units 126. This configuration in which all of the display units 124 and 126 originate from a same origin 128 is referred to a star configuration. The display units 124 and 126 slide into the rails 122 so that the display units 124, 126 are displaceable within the display device 120.

A cross-sectional image of an object is displayed on each one of the display units 124 and 126 according to the position of the corresponding display unit 124, 126. When a display unit 124, 126 is moved within the display device 120, the displayed image changes to represent the corresponding cross-section of the object according to the new position of the display unit 124, 126.

In one embodiment, a mirror is placed behind the display device 120 to give the illusion of a complete object. In this case, only half of the object is displayed but a user has the illusion of seeing a complete 3D representation of the object.

In one embodiment, the rails 122 are circular and the display units 124, 126 are rotatable about an angle of 360 degrees within the display device 120.

In one embodiment, the rails 122 are circular and the display device 120 is provided with display units evenly distributed within the display device 120, which means that the angle formed by two consecutive display units is constant. The display units can be motorized and they rotate at a predetermined speed within the display device 120. A predetermined time interval corresponds to the predetermined rotation speed and to the number of display devices. For each spatial vertical plane within the display, an image is displayed at each predetermined time. At any time, the rotation of the display units may be stopped such that a particular display unit occupies a specific position selected by the user in order to display a desired cross-section of the object.

Figure 7:
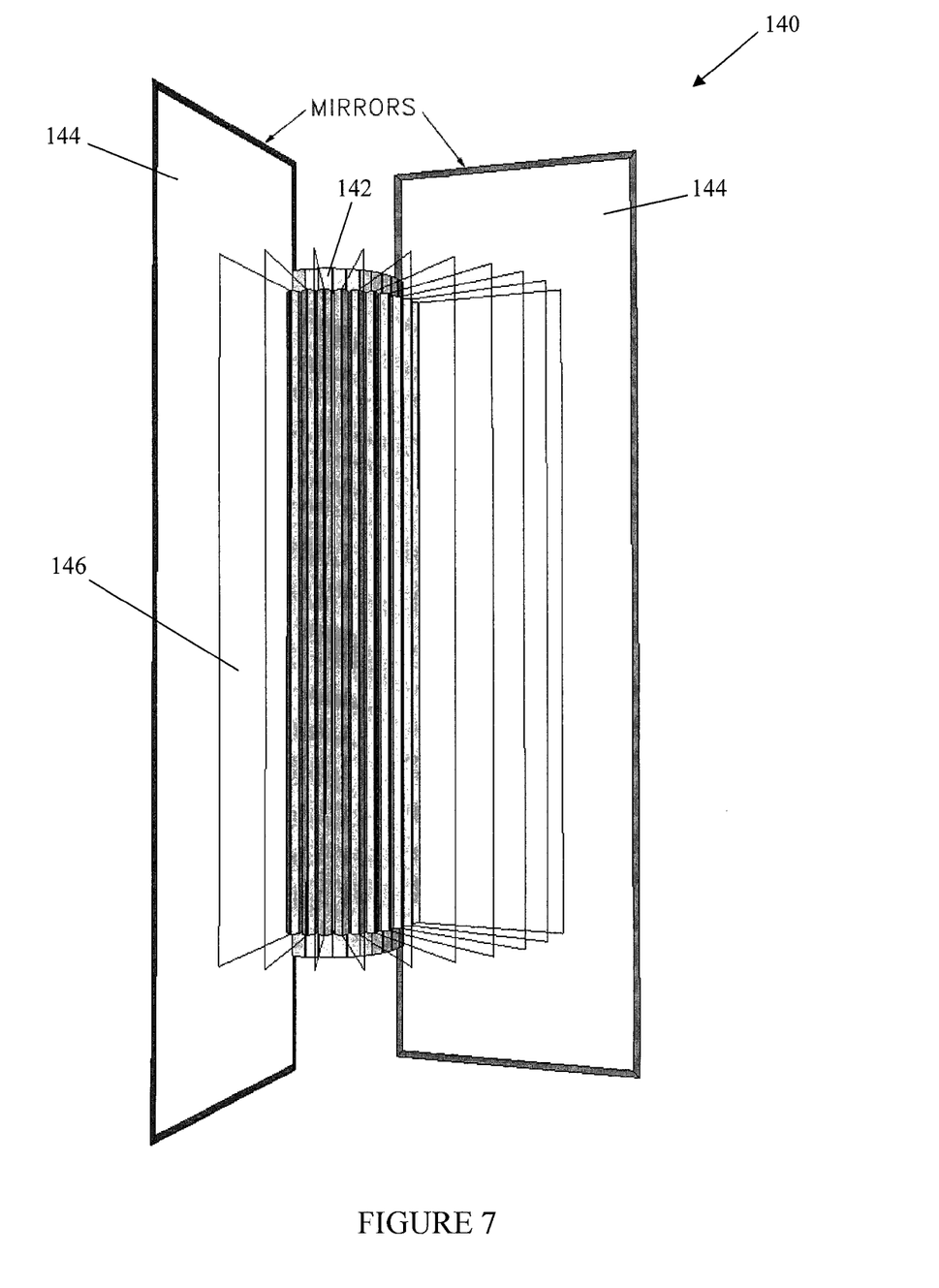
FIG. 7 is a perspective view of a display device comprising two mirrors, in accordance with an embodiment.

FIG. 7 illustrates one embodiment of a star display device 140 in which the frame comprises a display supporting piece 142 and two mirrors 144. The display supporting piece 142 has a quarter-cylindrical shape and is mounted between the two mirrors 144. Ten display units 146 are fixedly and immovably attached to the display supporting piece 142 at regular intervals. A cross-sectional image is displayed on each one of the display units 146 according to its position. When the display units 146 are substantially transparent, the use of mirrors at the 0 and 90 degree positions gives the illusion of viewing a 3D representation of the entire object. It should be understood that the mirrors 144 may be omitted in the display device 140 and/or the display units 146 may be non-transparent.

Figure 8:
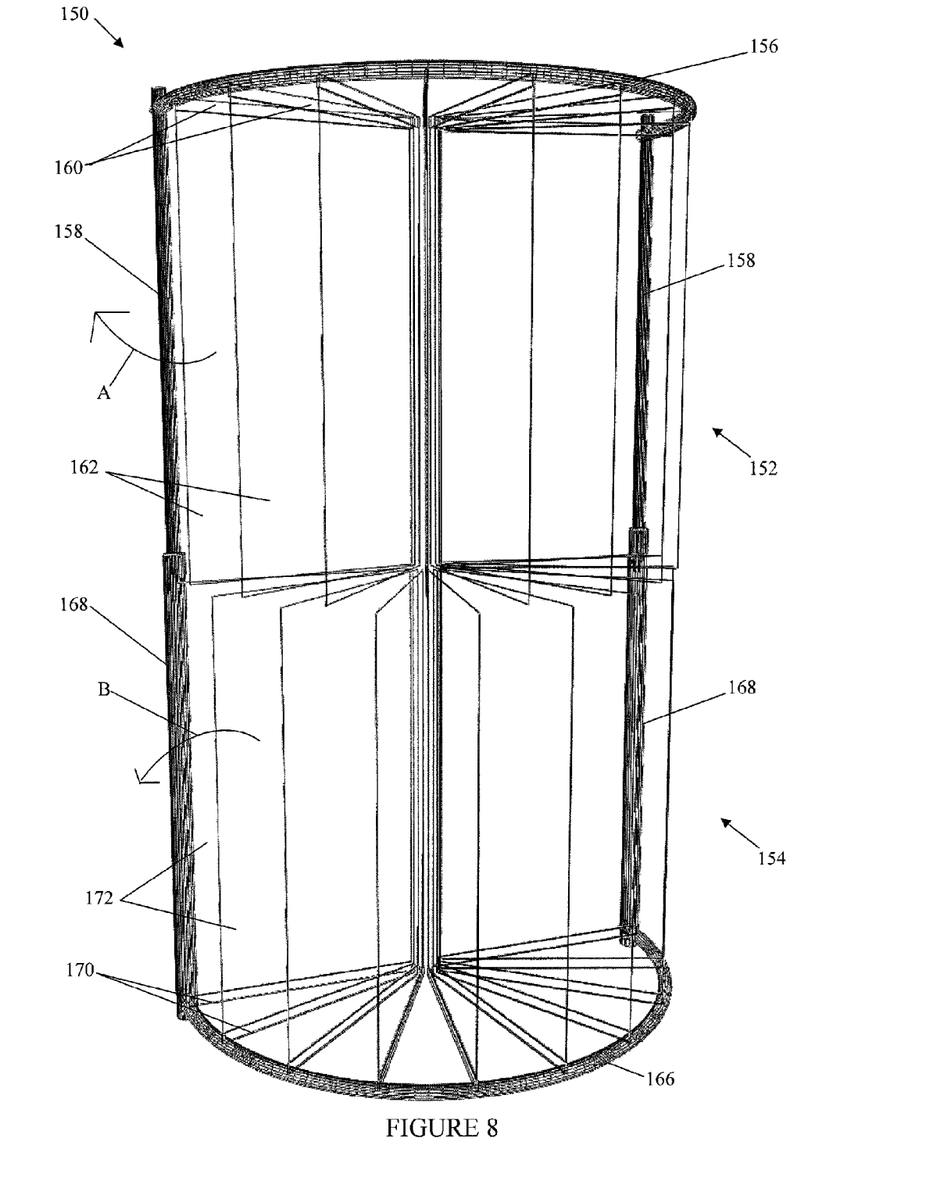
FIG. 8 is a perspective view of a two-stage display device in an open position, in accordance with an embodiment.

FIG. 8 illustrates one embodiment of a two-stage display device 150 comprising two stages 152 and 154 one on top of the other. The display device 150 has a cylindrical shape in order to substantially mimic the shape of a cylindrical object of which a representation is displayed on the display device 150. The first stage 152 comprises a half-circular rail 156, two lateral rods 158, nine display supporting rods 160 and nine display units 162. The display supporting rods 160 are secured to the circular rail 156. The rail 156, the lateral rods 158, and the display supporting rods form a frame supporting the display units 162. Each display unit 162 is secured at one end to a corresponding display supporting rod 160. The second stage 154 comprises a half-circular rail 166, two lateral rods 168, ten display supporting rods 170 and ten display units 172. As for the first stage 152, the display supporting rods 170 are secured to the rail 166, and the rail 166, the lateral rods 168 and the display supporting rods 170 form a frame for supporting the display units 172 which each have one end secured to a corresponding display supporting rod 170. Each display unit 162, 172 displays a representation of a cross-section of the cylindrical object in accordance with the spatial position in the 3D environment of the display unit 162, 172.

Both the first stage 152 and the second stage 154 of the display device 150 have a star configuration and the display units 162 and 172 are angularly equally spaced. The ten display units 172 are spaced by a 20 degrees angle such that the first display unit 172 is at the 0 degree position and the tenth display unit 172 is at the 180 degree position. The display units 162 are positioned in the stage 152 such that one display unit 162 is angularly located between two following display units 172. In this embodiment, two successive display units 162 are angularly spaced by a 20 degree angle and the first display unit 162 is at the 10 degree position while the ninth display unit 162 is at the 170 degree position.

Figure 9:
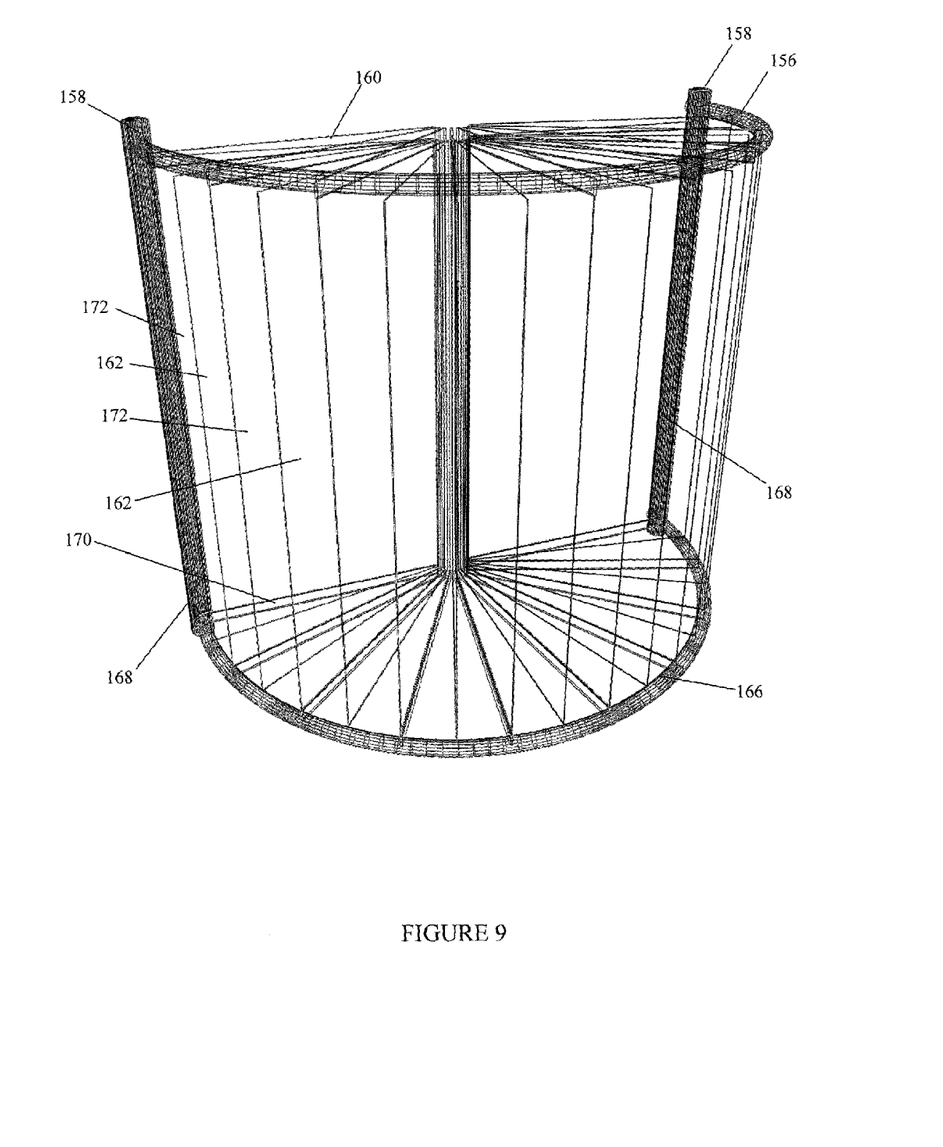
FIG. 9 is a perspective view of the two-stage display device of FIG. 8 in a close position, in accordance with an embodiment.

The lateral rods 158 are slidably secured to the lateral rods 168, such that the lateral rods 158 can fit into the lateral rods 168, as illustrated in FIG. 9. When the display device 150 is in the close position, the rods 158 are inserted into the rods 168, and each display unit 162 is positioned between two successive display units 172. As a result, when in the close position, the display device 150 comprises nineteen display units angularly spaced by a 10 degree angle. It should be understood that the number of display units 162 and 172 and the angular spacing between the display units 162 and 172 are exemplary only.

The size of the display device 150 is adjustable in accordance with the object to be represented thereon. A representation of a first cylindrical object having a first height can be displayed on the display device 150 when in the close position. A representation of a second cylindrical object having a second height longer than the first height can be displayed on the display device 150 when in the open position. Alternatively, an enlarged representation of an object may be displayed when the display device 150 is in the open position.

In one embodiment, the display supporting rods 160 and 170 are fixedly secured to the rails 156 and 166, respectively, and immobile within the first and second stages 152 and 154, respectively. In another embodiment, the display supporting rods 160 and 170 slide into the rails 156 and 166, respectively, so that the display units 162 and 172 are displaceable within the stage 152 and 154, respectively. In this embodiment, the display units 162 and 172 are also displaceable when the display device 150 is in the close position. In a further embodiment, the display supporting rods 160 and 170 are rotatably secured to the rails 156 and 166, respectively, such that the display units 162 and 172 can be moved in the directions of arrows A and B, respectively, illustrated in FIG. 8.

It should be understood that the display device 120, 140, 150 is connected to a computer comprising a processor, communication means and a memory on which the model of the object is stored. Any positioning system for determining the position of the display unit 124, 126, 146, 162, 172 can be used. The processor is configured for generating, for each display unit 124, 126, 146, 162, 172, the cross-section of the object in accordance with the position of the display unit 124, 126, 146, 162, 172. In one embodiment, the frame of the display device 120, 150 is motorized in order to move the display unit 124, 126, 162, 172. The motors are connected to the communication means of the computer and the position of the motors is controlled via the computer. The motors are adapted to communicate their respective positions to the computer which determines the position of the display units 124, 126, 162, 172 in accordance with the position of the motors.

In one embodiment, the transparent or non-transparent display unit may be a touchscreen. In this case, the display unit detects the location of a physical contact within its display area and the display unit itself is used as an input device for interacting with the computer. In one embodiment, touch is associated with a predetermined command such as a zoom command. Alternatively, a menu may appear when touching the display unit. The user selects a command to be executed by the computer from the displayed menu. Upon reception of the command by touching the display unit, the display device sends the command to the computer. The processor of the computer executes the command and generates a new image to be displayed on the display unit or moves the display unit to a new position, for example.

While the present description refers to a computer in order to simulate an object or to create an object using measured data, it should be understood that any system or terminal being adapted to perform these tasks can be used. In the case of an object model created using measured data, the sensors measuring the data may be adapted to create the appropriate image to be displayed on the display unit and to send it directly to the display unit.

While the description refers to identical display units when multiple display units are comprised in the display device, it should be understood that display units having different shapes and sizes can be used. The shapes and sizes of the display units may be chosen so that the shape of the display device substantially mimics the shape of the object to be represented, for example.

It should be understood that any transparent or semi-transparent display unit can be used for the display device. The number of display units comprised in the display device may depend on the transparency of the display units. While in some instances, a high degree of transparency may be required, a low transparency may be desired for other applications.

It should be noted that the present display device may have application in many fields. For example, in one embodiment, a display device such as the display device 80 could replace a usual television in order to display a movie in 3 dimensions. In this case, the object to be displayed in a 3D video frame of the movie and the cross-sectional images are different images which form the 3D video frame when overlaid. A colored screen such as a white screen can be placed behind the transparent display units.

Figure 10:
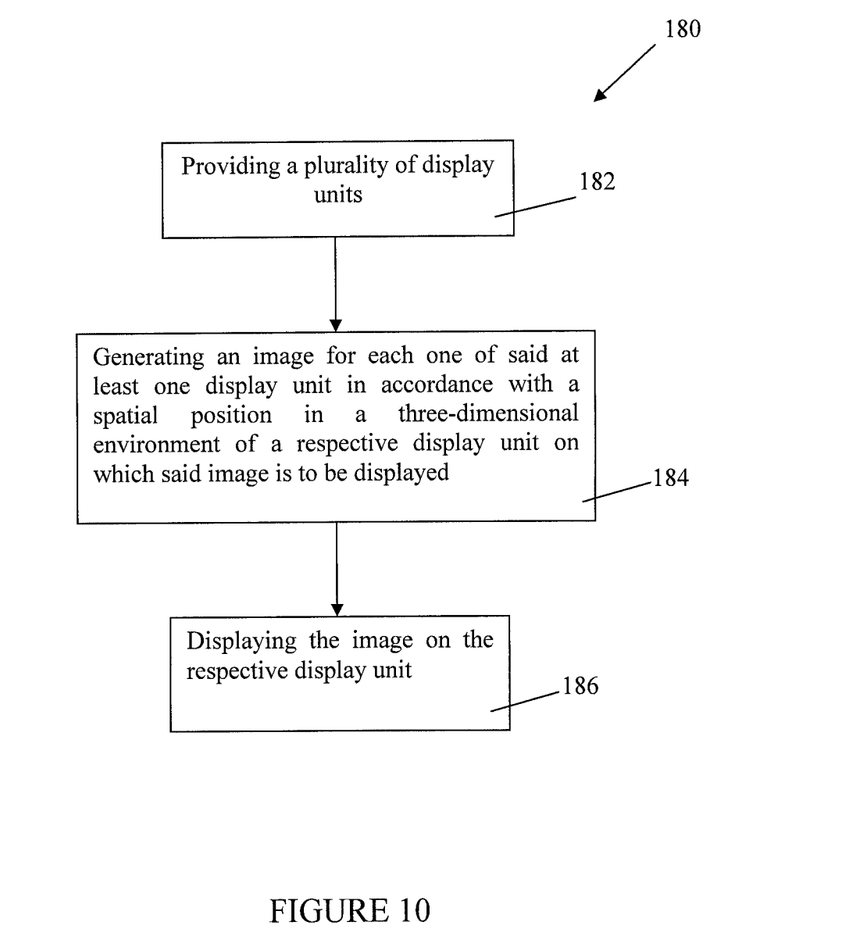
FIG. 10 is a flow chart of a method for displaying a representation of an object, in accordance with an embodiment.

FIG. 10 illustrates one embodiment of a method 180 for displaying a representation of an object. The first step 182 consists in providing a plurality of display units. The next step 184 is the generation of an image for each one of the plurality of display units. Each image is a cross-sectional representation of the object according to the spatial position in the three-dimensional environment of the respective display unit on which the image is to be displayed. The last step 186 consists in displaying the generated images on their respective display unit for each one of said at least one display unit.

In one embodiment, a user moves a display unit from an initial position to a desired position. The displacement of the display unit can be done manually. Alternatively, if the display device is motorized and the position of the display unit is controlled by the computer, the user enters the desired position for the display unit in the computer which displaces the display unit to the desired position. Subsequently or concurrently, the computer generates the cross-sectional image of the object in accordance with the desired position for the display unit and the cross-sectional image is displayed on the display unit.

In another embodiment, the user selects a cross-section view of the object using the computer. The processor generates the cross-sectional image corresponding to the selected cross-section and determines the target position for the display unit in accordance with the selected cross-section. The computer then moves the display unit to the desired position and displays the cross-sectional image on the display unit.

In one embodiment, a display device is used to visualize in real time the data of a nuclear reactor core simulation model. The display device can have a cylindrical shape to mimic the shape of the core reactor. Data such as fluid flow, core heat diffusion and reactivity parameters may be displayed on the display device. In one embodiment, the two display devices are cylindrical and comprise a plurality of display units which rotate while displaying the data images. In another embodiment, the nuclear reactor core display device comprises two display devices such as display device 140. For example, the symmetry of the nuclear core model is exploited so that only a 90 (or 60) degrees section of the reactor core is displayed. The use of mirrors at the 0 and 90 (or 60) degree positions gives the illusion of viewing the entire reactor core. This embodiment can be used for reactor core thermal-hydraulics and neutronics models such as RELAP 3D (a widely used core simulation package) since the actual simulated model only computes data for a 60 or 90 degree section, depending on core design symmetry. For example, the first display device is provided with 15 transparent display units spaced by 6 degrees intervals and the second display device is provided with 9 display units spaced by 10 degrees intervals.

Concerning nuclear power generation, a display device can also be used for displaying information about reactor pressure vessel, containment building, pressurizer or steam generator. It can also be used for the real-time monitoring of the internal parameters associated with these areas of interest. It should be understood that any data related to a simulated or measured property of a pressure vessel may be displayed using a display device.

In the meteorology field, a display device may be used for the real-time visualization of activity or area of interest, either originating from a model or from measured data. Fluid, gas and solid mechanics may also be displayed on a display device.

A display device can be used to display any kind of activity taking place inside a particular area of interest. For example, a display device is associated with a radar or a sonar to display the location of a vessel, an aircraft, a submarine and the like in 3 dimensions. It can also display a map of a battlefield in real time for immediate tactical and strategic adjustments. A display device can be used for a real-time visualization of complex orbital trajectories of a plurality of artificial satellites and real-time tracking of multiple threat matrices.

A display device can also have application in the financial field. For example, it can be used to display a real-time view of simultaneous market indicators or key decision-making factors. It can also be used to extrapolate observed trends or visually detect the emergence of patterns.

A display device has also application in operations research such as for the visualization of complex multidimensional solution spaces for cost optimization applications (linear programming, genetic algorithms, large project management, etc.).

In the medical field, a display device can be used to display a real-time view of an organ such as a brain or a heart or a representation of a simulated organ. For example, the behaviour of an artificial neural network may be studied while being displayed on the display device.

It can also be used in the field of learning or pattern discovery, such as the real-time visualization of complex systems, nonlinear system response and cellular automata evolution, for example.

It should be understood that the display device may be used in other fields of activity than those cited in the present description. In addition, in any of these fields of applications, multiple users are able to view the same and different information simultaneously due to the true three-dimensional nature of the device.

It should be noted that the embodiments of the invention described above are intended to be exemplary only. The present invention can be carried out as a method, can be embodied in a system. The scope of the invention is therefore intended to be limited solely by the scope of the appended claims.

I claim:

1. A display device for displaying cross-sectional representations of an object, said display device comprising:
a frame; and
a plurality of display units mounted on said frame, each one of said plurality of display units adapted to display a cross-sectional image of said object, said cross-sectional image comprising at least one internal feature of said object and being dependent on a spatial position in a three-dimensional environment of a corresponding one of the plurality of display units on which said cross-sectional image is to be displayed, said plurality of display units being connectable to a processor adapted to generate only one said cross-sectional image for each one of said plurality of display units as function of said spatial position, wherein said frame and said plurality of display units are shaped such that a shape of said display device substantially mimics a shape of said object;

wherein when there is a change to shape of said object, the shape of said display device is updated to substantially mimic the change of said object.

2. The display device as claimed in claim 1, wherein each of said plurality of display units has a fixed position relative to said frame.

3. The display device as claimed in claim 1, wherein at least one of the plurality of display units has a variable position relative to said frame.

4. The display device as claimed in claim 1 wherein at least one of said plurality of display units is transparent.

5. The display device as claimed in claim 4, further comprising at least one mirror positioned behind said plurality of display units.

6. The display device as claimed in claim 1, further comprising at least one motor adapted to move said plurality of display units and to communicate said spatial position for each one of said plurality of display units to said processor.

7. The display unit as claimed in claim 6, wherein said at least one motor is controllable by said processor.

8. The display device as claimed in claim 1, wherein said plurality of display units are positioned within said frame in a star configuration.

9. The display device as claimed in claim 1, wherein said at least one internal feature is time-dependent and each one of said plurality of display units is adapted to display said cross-sectional image in substantially real-time.

10. The display device as claimed in claim 1, wherein said cross-sectional image represents a cross-section of a nuclear reactor core.

11. The display device as claimed in claim 10, wherein said at least one internal feature comprises at least one of a fluid flow, a core heat diffusion and a reactivity parameter.

* * * * *